No. 690,502. Patented Jan. 7, 1902.
H. H. WING.
METHOD OF MAKING HYDROGEN SULFID.
(Application filed Apr. 5, 1900.)
(No Model.) 2 Sheets—Sheet 2.
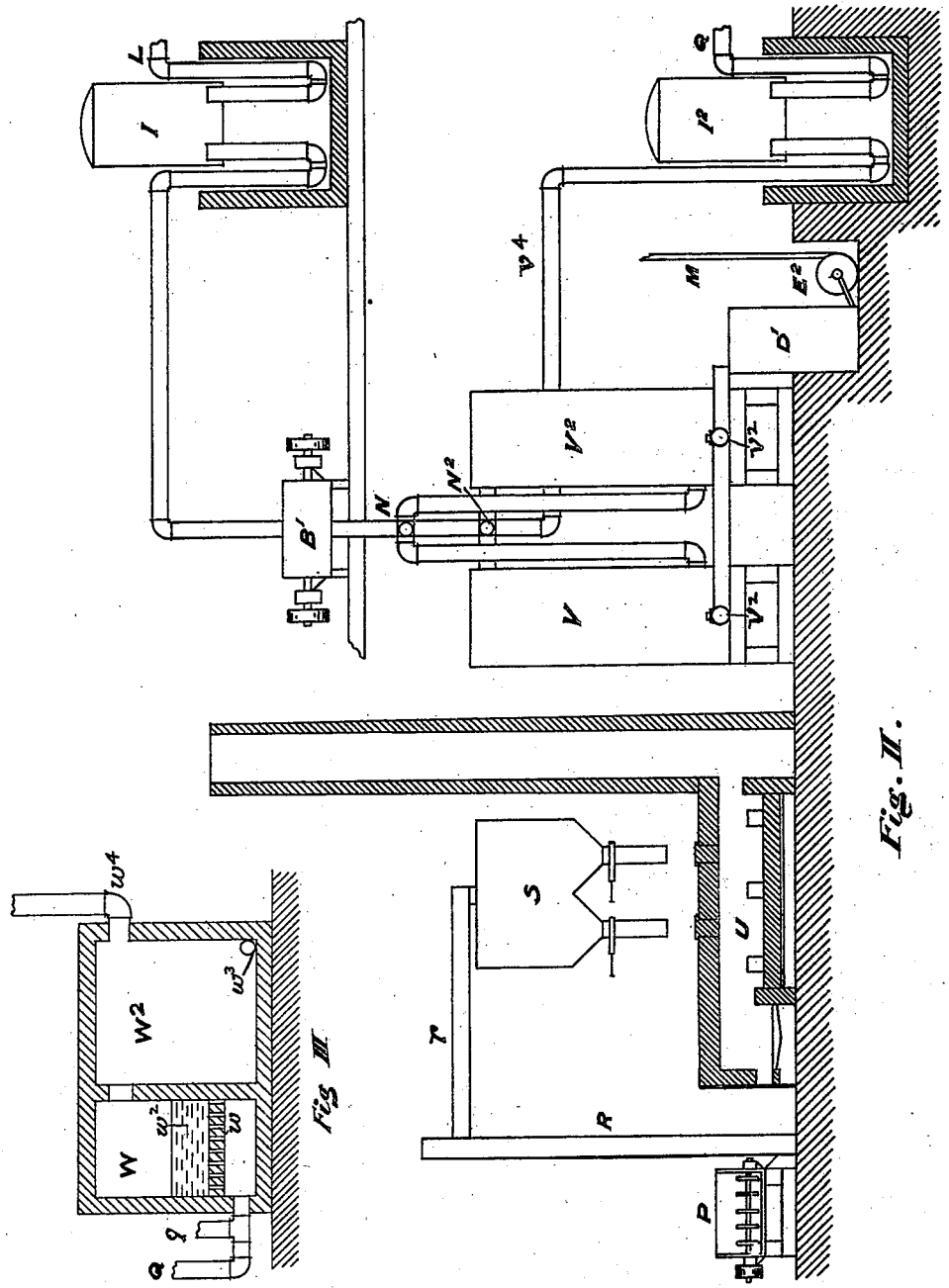
Witnesses
Ernest G. Willocks.
Loun Prentiss
Inventor
Herbert H. Wing
By his Attorney

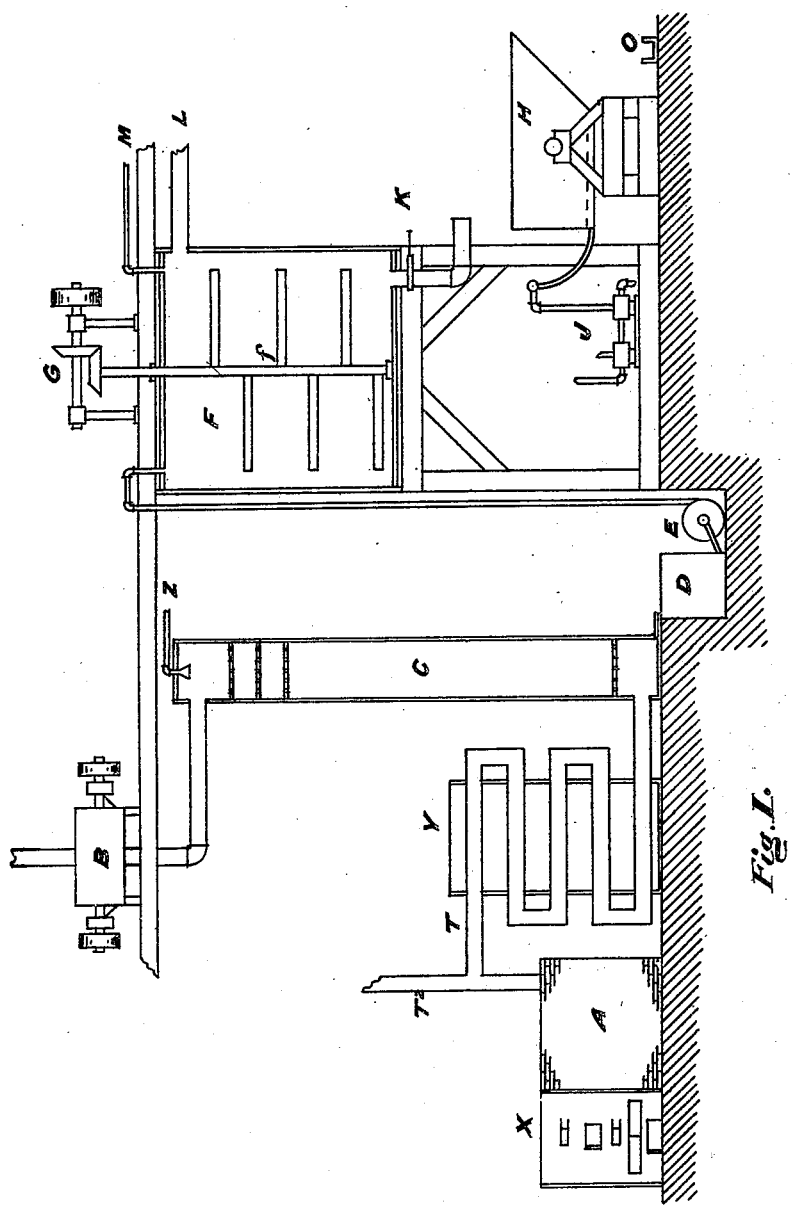
Fig. I.

UNITED STATES PATENT OFFICE.

HERBERT H. WING, OF BUFFALO, NEW YORK.

METHOD OF MAKING HYDROGEN SULFID.

SPECIFICATION forming part of Letters Patent No. 690,502, dated January 7, 1902.

Application filed April 5, 1900. Serial No. 11,785. (No specimens.)

*To all whom it may concern:*

Be it known that I, HERBERT H. WING, a citizen of the United States, residing at Buffalo, in the county of Erie and State of New York, have invented certain new and useful Improvements in Processes of Obtaining Sulfureted Hydrogen and By-Products; and I do hereby declare the following to be a full, clear, and exact description of the invention, such as will enable others skilled in the art to which it appertains to make and use the same.

The object of my invention is to improve upon the present processes of obtaining sulfureted-hydrogen gas and producing therefrom sulfur and by-products, whereby the economy of the production is enhanced and a greater saving is effected than has before been attained, all of which is effected by the improved process hereinafter described, and specifically set forth in the claims.

It is well known that a mixture of alkali waste or of any sulfid of an alkaline-earth metal or an alkali metal and water may be completely decomposed with the production of a carbonate and sulfureted-hydrogen gas by passing through it, preferably in a series of vessels, gases containing carbonic-acid gas—such, for instance, as those evolved from a closed limekiln; but the sulfureted hydrogen produced is diluted by such large and varying quantities of other gases that it cannot easily or economically be turned to account. By the Chance process the sulfureted hydrogen is obtained mixed with smaller and very constant quantities of other gases, so that it may be burned directly in the air for the manufacture of sulfurous and sulfuric acids or can be profitably treated for the production of sulfur or for other purposes. This result is accomplished by allowing a portion of the nitrogen which is always contained in very large amount in limekiln-gases to pass out of the apparatus during the time that the carbonic-acid gas and the sulfureted-hydrogen gas, which is the first result of the decomposition, are being absorbed by the calcium sulfid and calcium hydroxid of the alkali waste. By thus separating a portion of the nitrogen from the gases entering the apparatus the percentage of sulfureted hydrogen in the final gases is increased to such an extent that it can be burned for sulfuric-acid making or for the production of sulfur in a suitable kiln—such, for instance, as the Claus kiln. By my present invention the final gases obtained contain even a higher percentage of sulfureted hydrogen than by the Chance process, whereby they can be much more economically utilized and are at the same time more economically produced.

A convenient form of apparatus for carrying my invention into effect is illustrated in Figures I and II.

In the drawings, X is a pyrites-burner, ore-roaster, smelting-furnace, or any form of apparatus from which fumes containing $SO_2$ are obtained.

A is a dust-settling chamber.

T is a pipe leading from the chamber A through the cooler Y to the tower C, which is filled with coke or with perforated disks, down through which water is allowed to trickle from the pipe Z.

B is a suction-blower to aid the passage of the fumes through the tower C.

D is a receiving-tank, and E a rotary pump for raising the liquor collecting in tank D into the generator F, which is equipped with a stirring apparatus $f$, operated by the mechanism G.

M is a pipe by which the rotary pump $E^2$ of Fig. II delivers the material from the tank D' into the generator F.

L is a pipe which delivers the gases produced in the generator F into the gas-holder I of Fig. II.

K is an outlet-valve.

H is a tank equipped with a suction-filter, which is connected with the vacuum-pump J.

O represents a spout or conveyer-trough for conducting the contents of tank H to any desired point, as to a storage-bin or to the mixing apparatus P of Fig. II, which represents any suitable form of mixing-machine.

R is an elevator, and S is a bin, which by means of a conveyer $r$ receives the material raised in the elevator R.

U is a reverberatory furnace.

V and $V^2$ are a set of carbonators and are connected by pipes, as shown, with the blower B' and the gas-holder I.

N and $N^2$ are four-way valves.

D' is a tank for receiving the contents of V and $V^2$.

Q is an outlet-pipe.

The method of operating this apparatus consists in first passing the gases from the source X, containing $SO_2$, through the dust-settling chamber A, whereby any dust contained in them is deposited, thence by the pipe T through the cooler Y and up the tower C by the aid of the suction-blower B. The tower C is filled with coke or perforated disks or other equivalent means, by which a large surface of water from the pipe Z is exposed to the fumes containing $SO_2$ gas, so that the liquor which is collected in the tank D is a solution of sulfurous acid, which is then pumped into the generator F by means of the rotary pump E. The agitator $f$ in the generator F is kept continually at work by means of the mechanism G. Through the pipe M an emulsion of carbonate of lime, which is produced as a product of a reaction to be described later, is pumped into the generator F. When these two liquors are brought into contact in the required proportions, the sulfurous acid combines with the carbonate of lime with the production of a highly-concentrated carbonic-acid gas, which is collected in the gas-holder I, and a monosulfite of lime, which is insoluble and is precipitated. After the reaction is completed the contents of the generator F are discharged through the valve K into the filter-tank H. The vacuum-pump J is then started and the liquor in the contents of generator F is drawn through the filter in the bottom of H, while the insoluble monosulfite remains on the filter, from which it is removed by tilting the tank H and discharging it into the trough O. The liquid which the vacuum-pump J pumps through the filter in tank H can be used over again in the tower C, whereby any bisulfite or sulfurous acid which was not reacted upon in the generator F is saved and can be used in the repeated operations. The monosulfite which is thus separated from the liquor on the filter in the tank H is then mixed with powdered carbon in the form of pulverized coal or coke, and, according to the form of furnace, the monosulfite may be still further freed from any water held mechanically by it either before or after mixing with the coal or coke. The mixing is done in the apparatus P, and the mixture is then elevated and conveyed to the hopper-bin S. From here it is discharged into the furnace U, where it is heated and the sulfite is reduced to a sulfid. It is then removed from the furnace and is introduced into the carbonators V and $V^2$. It may be pulverized before being introduced into the carbonators in case the reaction in the furnace was carried on at a sufficiently high temperature to cause some fusion of the materials. The sulfid is either mixed with water before being introduced into the carbonator or water is added to it in the carbonator, so that a creamy mixture is obtained. Then the highly-concentrated carbonic-acid gas which was produced in the generator F and has been collected in the gas-holder I, is now pumped, by means of the pump B', into the bottom of the carbonators V and $V^2$, where the sulfid contained in the creamy emulsion is converted into the carbonate and a highly-concentrated sulfureted-hydrogen gas is evolved, which is conducted through pipe $V^4$ to the gas-holder $I^2$.

In order to secure a highly-concentrated sulfureted-hydrogen gas in holder $I^2$ containing only small quantities of carbonic-acid gas, an arrangement of working two or more carbonators like V and $V^2$ is preferably employed. In the arrangement shown the following system of operating them is used: The carbonic-acid gas is first passed into the bottom of the carbonator V. Then the four-way outlet-valve $N^2$ is so turned that the exit-gases from V pass into the pipe $v^4$, which leads to the gas-holder $I^2$. During the first part of the introduction of the highly-concentrated carbonic-acid gas into the carbonator V there will be almost complete absorption of the gases passing in, the degree of the absorption depending on the purity of the highly-concentrated carbonic-acid gas. During the absorption of the gas the carbonic-acid gas is combined to form a carbonate of the sulfid or any hydrate of lime in the liquor with the liberation of sulfureted-hydrogen gas, which immediately combines with the sulfid to form the sulphydrate, so that for a short period only the impurities in the highly-concentrated gas pass through the solution. Then as more carbonic-acid gas is continually being forced into the solution the sulphydrate is decomposed, and there being less sulfid remaining unconverted into sulphydrate there is a gradual increase of sulfureted hydrogen evolved until a time is reached when the exit-gases from carbonator V will be very highly concentrated sulfureted-hydrogen gas. While the gases are being mostly absorbed and only the the diluting-gases are passing out of the carbonator V the other carbonator $V^2$ can be filled with sulfid emulsion. Then as soon as the exit-gases from carbonator V show a trace of carbonic-acid gas in them the four-way outlet-valve $N^2$ is turned so that the gases from carbonator V are passed first in an upward direction to the four-way inlet-valve N, by which they are turned into the bottom of $V^2$. These gases contain principally sulfureted hydrogen, and as time goes on increasing quantities of carbonic-acid gas are at first absorbed, as described when first they enter carbonator V. For a time, then, the gases are passing through both carbonators. Then the exit-gases from carbonator V begin to show only traces of sulfureted hydrogen. The four-way inlet-valve N is then turned so that the highly-concentrated carbonic-acid gas passes directly into the bottom of $V^2$. The contents of carbonator V are then discharged by opening the valve $v^2$ at the bottom and are collected in the tank D'. As they consist of emulsion of carbonate of lime, they are pumped back through pipe M into the generator F by the rotary pump E², where they are used for the production of a fresh quantity of highly-concentrated carbonic-acid gas. The carbonator V is then filled with a new batch of sulfid emulsion. By that time the exit-gases from V² begin to show traces of carbonic-acid gas, and then the four-way exit-valve N² is turned so that the exit-gases of V² are passed into the bottom of V, and after passing the highly-concentrated carbonic-acid gas through V² until all the sulfid is converted into carbonate the contents are discharged into D' and a new batch of sulfid emulsion is put into V². As the carbonic-acid gas is so pure and highly concentrated, it is not necessary for me to allow any of the diluting-gases, which simply pass through the carbonators, to escape into the air, as the final exit-gases, which are collected in I², are already much more concentrated than the required limit to make them when burned give sufficiently-concentrated fumes for acid-making or for producing sulfur in a kiln like the Claus kiln. I thus avoid the nuisance and expense of having to handle large quantities of gases and render them inoffensive by absorbing the small amounts of sulfureted hydrogen that such gases always contain, and my apparatus is much simpler and less of it is required. As other combinations of carbonators may be used and other valve arrangements may be devised and more carbonators to a set be used, I do not confine myself to the particular design or number of parts shown.

In order to make up for the loss of carbonic-acid gas which goes into the solutions, that which is lost mechanically, and that which goes into the gas-holder I² along with the highly-concentrated sulfureted-hydrogen gas, I preferably add the required quantity of powdered limestone to the charge of the precipitated carbonate of lime obtained from the carbonators V and V². This also makes up for any loss of lime salts as well. Instead of using lime salts any other alkaline-earth metal or alkali metal can be used; also, instead of making a solution of sulfurous acid in the tower C by the use of disks or in place of a tower apparatus a tank like the generator F can be used and the $SO_2$ fumes pumped through it, and an emulsion of monosulfite solution will thus be obtained. By then pumping that solution into the generator F the reaction between the bisulfite and the carbonate liberates the same amount of carbonic-acid gas and doubles the amount of monosulfite. One half of it may then be used for the production of another batch of bisulfite solution, while the other half furnishes the usual quantity of monosulfite to be reduced to the sulfid, &c.

After obtaining a highly-concentrated sulfureted-hydrogen gas in the holder I² the uses to which it can be put are numerous, among which the following may be mentioned: The gases may be burned in a Claus kiln by mixing air with them, or, as these gases are particularly rich in sulfureted hydrogen, some of the original fumes containing $SO_2$ can be mixed with them along with some air, by which means an additional quantity of sulfur can be obtained in the Claus kiln without its being necessary to make a sulfite, then a sulfid, &c., of it. The richer in sulfureted hydrogen the final exit-gases in I² are the greater percentage of fumes containing $SO_2$ can be mixed with them and burned in the Claus kiln. Thus by obtaining highly-concentrated sulfureted-hydrogen gas more sulfur can be obtained directly and at practically no expense for operation from fumes containing $SO_2$ gas up to the limit of producing fifty per cent. more sulfur than by burning in the Claus kiln only sulfureted-hydrogen gas mixed with air. Another method of utilizing the sulfureted-hydrogen gas is to mix it with sulfur-dioxid gas and pass the mixture up through a tower containing disks and down which a solution of calcium chlorid is passed. These gases combine to form principally sulfur, according to the same reaction as when they are burned in the Claus kiln. The sulfur is then separated from the solution of calcium chlorid in any of the well-known ways.

Instead of obtaining the sulfid compounds by reduction of monosulfites the sulfid of calcium known as "alkali waste" can be used. One method of operating the process by use of alkali waste would be to use the precipitated carbonate obtained from the carbonators V and V², as already described, and then produce a calcium monosulfite in the generator F. When it is desired to produce from the monosulfites obtained as before described a bisulfite solution which shall contain the magnesium bisulfite along with the calcium bisulfite, I then would use a powdered dolomite rock in the carbonator F, and thereby obtain the monosulfites of calcium and magnesium on the filter in H, and from them the bisulfite liquors containing the bisulfite of calcium and magnesium could be obtained, as before described. In that case I would have the precipitated carbonate of lime obtained from carbonating the alkali waste in the carbonators V and V² to dispose of in the same manner that they are now disposed of after working the Chance process, or where it would be necessary to supply a monosulfite mixture requiring a certain percentage of magnesium monosulfite along with the calcium monosulfite a magnesium monosulfite could be prepared by the use of calcined magnesia, or ground magnesite could be added to the precipitated carbonate of lime as obtained from the carbonators V and V². By this arrangement the two valuable products—monosulfites of calcium and magnesium and highly-concentrated sulfureted-hydrogen gas, which could be utilized as before mentioned—would become outputs of this process, while the materials used would be sulfur fumes, magnesia compounds, and alkali waste or its equivalent. In the place of alkali waste the spent lime obtained from the purification of gas by slaked lime can be used, as it contains large quantities of the sulfid of calcium.

As I have mentioned, the carbonic-acid gas which is obtained in the decomposition of the carbonate in the generator F is highly concentrated, and I obtain by its use a highly-concentrated sulfureted-hydrogen gas, sufficiently so that this gas can be diluted with fumes containing $SO_2$, and then burning them both in the Claus kiln. It is also possible under certain circumstances to mix the highly-concentrated carbonic-acid gas which 1 thus produce with the less-concentrated carbonic-acid gas obtained from the lime-kilns or from the combustion of fuel or other sources and to even then obtain a gas of sufficient concentration to produce a final exit-gas containing sufficiently high percentage of sulfureted hydrogen so that it will burn in a Claus kiln with a mixture of air or even with the admixture of some fumes containing $SO_2$ gas and this without allowing any portion of the entering gas to escape from the apparatus, as in the Chance process.

When a mixture of the monosulfites of calcium and magnesium is produced in the generator F and separated from the liquor and is then heated in a retort, the magnesium monosulfite can be practically decomposed into magnesium oxid and $SO_2$ gas, while the calcium monosulfite is unchanged. In this manner a pure and highly-concentrated sulfurous-acid gas can be obtained, which can be liquefied or used for any other purpose. If instead of heating this mixture in a retort, so that the $SO_2$ gas can be collected unmixed with other gases, the mixture is mixed with powdered coal, using only the same proportion of coal for calcium monosulfite as has before been referred to and heating the mixture the same as has been before described in the furnace U of Fig. II, the calcium sulfite will be reduced to the sulfid, while the magnesium monosulfite will be decomposed into the oxid, which will be mixed with the calcium sulfid. The chimney-gases will then contain the $SO_2$ gas which has been expelled from the magnesium monosulfite and can be used to help make up the solutions in the tower C the same as any other fumes containing sulfurous-acid gas. The mixture of calcium sulfid and magnesium oxid is then put into the carbonators V and $V^2$ and then treated with the concentrated carbonic-acid gas. The calcium sulfite will be decomposed in the same manner as before described and the sulfureted-hydrogen gas in a highly-concentrated condition will be given off. This sulfureted-hydrogen gas will combine with the magnesium hydrate, forming the sulfid; but any sulfid compound of magnesium, as well as of calcium, will then be decomposed by the carbonic-acid gas, so that the final gas will be highly-concentrated sulfureted-hydrogen gas, which is then collected. A portion of the carbonic-acid gas will combine with the magnesium hydrate which is formed when the oxid is added to the water along with the calcium sulfid, and as the carbonic-acid gas is pumped through the carbonators the magnesium hydrate is converted into supercarbonate, which goes into solution, while the calcium carbonate formed by the decomposition of the calcium sulfid remains insoluble. The calcium carbonate is then separated from the solution of the magnesium supercarbonate and is used over again for the generation of the highly-concentrated carbonic-acid gas in the generator F, as before described. The solution of the magnesium supercarbonate can then be treated in any of the following ways: It can be brought in contact with fumes containing sulfurous-acid gas, whereby the monosulfite of magnesium is formed, or by bringing it into contact with a solution of sulfurous acid or a bisulfite in a closed vessel the monosulfite of magnesium will be formed, and the carbonic-acid gas which is liberated at the same time can be collected. The monosulfite is then separated from the liquor and is then subsequently used to make up solutions of the bisulfite of magnesium, or the solution of the supercarbonate of magnesium may be heated to near the boiling-point, when the supercarbonate will be decomposed, with the formation of the normal carbonate, which precipitates and can then be separated from the liquor, whereby a very pure magnesium carbonate is obtained, or magnesium hydrate may be added to the solution of supercarbonate, whereby the normal carbonate will be precipitated.

From the foregoing description it is apparent that for the purposes of my process the carbonates of the alkali metals and magnesium are equally as available as those of the "alkaline-earth metals," strictly so called. For that reason and to avoid the use of alternative terms I include magnesium in the term "alkaline-earth metals" as used in the claims and include in that term the alkali metals as full equivalents of the alkaline-earth metals (including magnesium) in the carrying out of my process. When a solution of a bisulfite of any of said metals is brought in contact with a carbonate thereof, the same reaction takes place as if a solution of sulfurous acid were used, one-half of the sulfur combined as a bisulfite being available as sulfurous acid to react with the carbonate, for which reason either a solution of sulfurous acid or a solution of a bisulfite contains available sulfurous acid for my purposes, and either one may be employed, as hereinbefore described.

What I claim as my invention is—

1. The herein-described process of obtaining sulfureted-hydrogen gas and a by-product which consists in bringing a solution containing available sulfurous acid into contact with a carbonate of any of the alkaline-earth metals, whereby such carbonate is converted into sulfite and carbonic-acid gas is given off; collecting the carbonic-acid gas; passing such carbonic-acid gas into contact with a sulfid of one of said metals in the presence of water, whereby a concentrated sulfureted-hydrogen gas is evolved and said sulfid is converted into a carbonate; and collecting said sulfureted-hydrogen gas; substantially as described.

2. The herein-described process of obtaining sulfureted-hydrogen gas and a by-product which consists in bringing a solution containing available sulfurous acid into contact with a carbonate of any of the alkaline-earth metals, whereby such carbonate is converted into sulfite and carbonic-acid gas is given off; collecting the carbonic-acid gas; passing such concentrated carbonic-acid gas mixed with gases containing a smaller percentage of carbonic-acid gas into contact with a sulfid of one of said metals in the presence of water, whereby a concentrated sulfureted-hydrogen gas is evolved and said sulfid is converted into a carbonate; and collecting said sulfureted-hydrogen gas; substantially as described.

3. The herein-described process of obtaining sulfureted-hydrogen gas and by-products which consists in bringing a solution containing available sulfurous acid into contact with a carbonate of any of the alkaline-earth metals, whereby such carbonate is converted into sulfite and carbonic-acid gas is given off and collected; separating the sulfite from the liquor and converting the same into a sulfid; passing carbonic-acid gas into contact with a sulfid of one of said metals in the presence of water, whereby a concentrated sulfureted-hydrogen gas is evolved and said sulfid is converted into a carbonate; and collecting said sulfureted-hydrogen gas, substantially as described.

4. The herein-described process of obtaining sulfureted-hydrogen gas (and by-products) which consists in bringing a solution containing available sulfurous acid into contact with a carbonate of any of the alkaline-earth metals, whereby such carbonate is converted into sulfite and carbonic-acid gas is given off and collected; separating the sulfite from the liquor and converting the same into a sulfid; passing such concentrated carbonic-acid gas mixed with gases containing a smaller percentage of carbonic-acid gas into contact with the sulfid of one of said metals in the presence of water, whereby a concentrated sulfureted-hydrogen gas is evolved and said sulfid is converted into a carbonate; and collecting said sulfureted-hydrogen gas; substantially as described.

5. The herein-described process of obtaining sulfureted-hydrogen gas and a by-product which consists in bringing a solution containing available sulfurous acid into contact with a carbonate of any of the alkaline-earth metals, whereby such carbonate is converted into sulfite and carbonic-acid gas is given off; collecting the carbonic-acid gas; passing such carbonic-acid gas into contact with a sulfid of one of said metals in the presence of water, whereby a concentrated sulfureted-hydrogen gas is evolved and said sulfid is converted into a carbonate; collecting said sulfureted-hydrogen gas; and separating said carbonate from the liquor in which it was produced, substantially as described.

6. The herein-described process of obtaining sulfureted-hydrogen gas which consists in bringing a solution containing available sulfurous acid into contact with a carbonate of any of the alkaline-earth metals, whereby such carbonate is converted into sulfite and carbonic-acid gas is given off and collected; separating said sulfite from the liquor and heating it with a reducing agent, whereby the sulfite is converted into a sulfid; passing carbonic-acid gas into contact with a sulfid of one of said metals in the presence of water, whereby a concentrated sulfureted-hydrogen gas is evolved and said sulfid is converted into a carbonate; and collecting said sulfureted-hydrogen gas, substantially as described.

In testimony whereof I hereto affix my signature in presence of two witnesses.

HERBERT H. WING.

Witnesses:
JOHN G. ULLMANN,
FREDERICK K. WING.